United States Patent [19]

Hedgcock

[11] E Re. 31,168

[45] Reissued Mar. 8, 1983

[54] WEAR RING FOR SPRING OF FRICTION COUPLING

[75] Inventor: Richard L. Hedgcock, East Peoria, Ill.

[73] Assignee: Caterpillar Tractor Co., Peoria, Ill.

[21] Appl. No.: 104,329

[22] Filed: Dec. 17, 1979

Related U.S. Patent Documents

Reissue of:

[64] Patent No.: 4,121,705
Issued: Oct. 24, 1978
Appl. No.: 820,175
Filed: Jul. 29, 1977

[51] Int. Cl.[3] ..... F16D 13/44

[52] U.S. Cl. ..... 192/89 B; 192/70.27; 192/18 A; 188/170; 267/162

[58] Field of Search ..... 192/89 B, 89 R, 70.27, 192/111 B, 70.13, 70.27, 18 A, 18 R, 91 A; 64/30 R; 188/170; 308/163; 267/162

[56] References Cited

U.S. PATENT DOCUMENTS

| | | | |
|---|---|---|---|
| 3,266,608 | 8/1966 | Lemieux | 192/89 B |
| 3,633,715 | 1/1972 | Burnett | 188/170 |
| 3,640,361 | 2/1972 | Spichala | 192/89 B |
| 3,831,718 | 8/1974 | Muller et al. | 188/170 |
| 3,912,058 | 10/1975 | Parkins | 192/18 A |
| 4,063,846 | 12/1977 | Eagle | 308/163 X |
| 4,086,995 | 5/1978 | Spokas | 192/111 B |

*Primary Examiner*—George H. Krizmanich
*Attorney, Agent, or Firm*—Wegner, Stellman, McCord, Wiles & Wood

[57] ABSTRACT

A power drive assembly having a housing, a drive mechanism removably installed in the housing, an annular biasing spring installed in the housing for biasing the mechanism, and a wear ring arrangement including an undercut annular groove in the mechanism opening coaxially toward an end of the biasing spring and a wear ring removably installed in the groove to engage the end of the biasing spring in the assembled arrangement of the power drive assembly. The wear ring has a cross section complementary to the undercut groove cross section whereby the mechanism may be installed in the housing with the groove opening downwardly and the wear ring maintained in the groove for facilitated assembly of the power drive.

20 Claims, 3 Drawing Figures

WEAR RING FOR SPRING OF FRICTION COUPLING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to power drives and in particular to the installation of spring biasing means therein.

2. Description of the Prior Art

In one form of power drive assembly, a clutch pack and a brake pack are installed within suitable housing portions for controlling the delivery of power from a prime mover to the traction means of the vehicle. The clutch pack and the brake pack may include a plurality of plates which are biased by means of suitable Belleville springs for controlling the operation of the clutch and brake means of the drive.

In assembling such power drive assemblies, subassembled components may be installed within recessed portions, such as recessed portions of the housing elements. Such installation raises a problem in connection with the provision of wear rings for use in connection with the Belleville biasing springs in that the wear rings are loosely retained in association with the portion of the mechanism being introduced into the recess so that it is difficult to maintain the wear ring in accurate disposition for engaging the Belleville springs properly in the assembled arrangement. Conventionally, the mechanism is installed by a vertical downward movement into the recess which is disposed to open upwardly and, thus, the wear ring tends to fall from the mechanism presenting a serious problem in the assembly operations.

In one conventional power drive assembly, the wear ring mounting problem is present relative to both the clutch pack and the brake pack as each is similarly installed by movement thereof downwardly into an upwardly opening recess portion of a housing element of the assembly.

SUMMARY OF THE INVENTION

The present invention comprehends an improved power drive assembly arrangement wherein the wear ring is effectively maintained in association with the mechanism to permit facilitated installation of the mechanism into the outwardly opening recess of the housing element as discussed above and assuring that the wear ring is properly accurately disposed relative to the Belleville spring in such assembly.

The invention more specifically comprehends the provision of cooperating undercut means on the wear ring and mechanism groove to maintain the wear ring in association with the mechanism sufficiently to permit such installation while yet permitting ready installation and replacement of the wear ring when desired upon disassembly of the power drive assembly.

In the illustrated embodiment, the mechanism groove is provided with an undercut cross section and the wear ring is provided as a split ring with a similar, or complementary, undercut configuration whereby the wear ring is readily removably maintained in the mechanism groove during assembly of the power drive.

In the illustrated embodiment, the wear ring carried by each of the brake pack and clutch pack are arranged in the novel manner discussed above so as to permit facilitated assembly of both the clutch and brake in the power drive assembly.

The invention further comprehends provision of a similar wear ring arrangement in the housing for engaging the opposite end of the Belleville spring assembly, thereby permitting the assembly of the power drive with the housing portion either uppermost or lowermost, as desired.

In the illustrated embodiment, the undercut surface extends at an angle of approximately 5° to 10° to the axis of the annular groove and may be provided in only one sidewall of the groove to provide facilitated installation and removal of the wear ring while yet providing positive retention thereof in the groove during such assembly of the power drive.

Thus, the power drive assembly of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
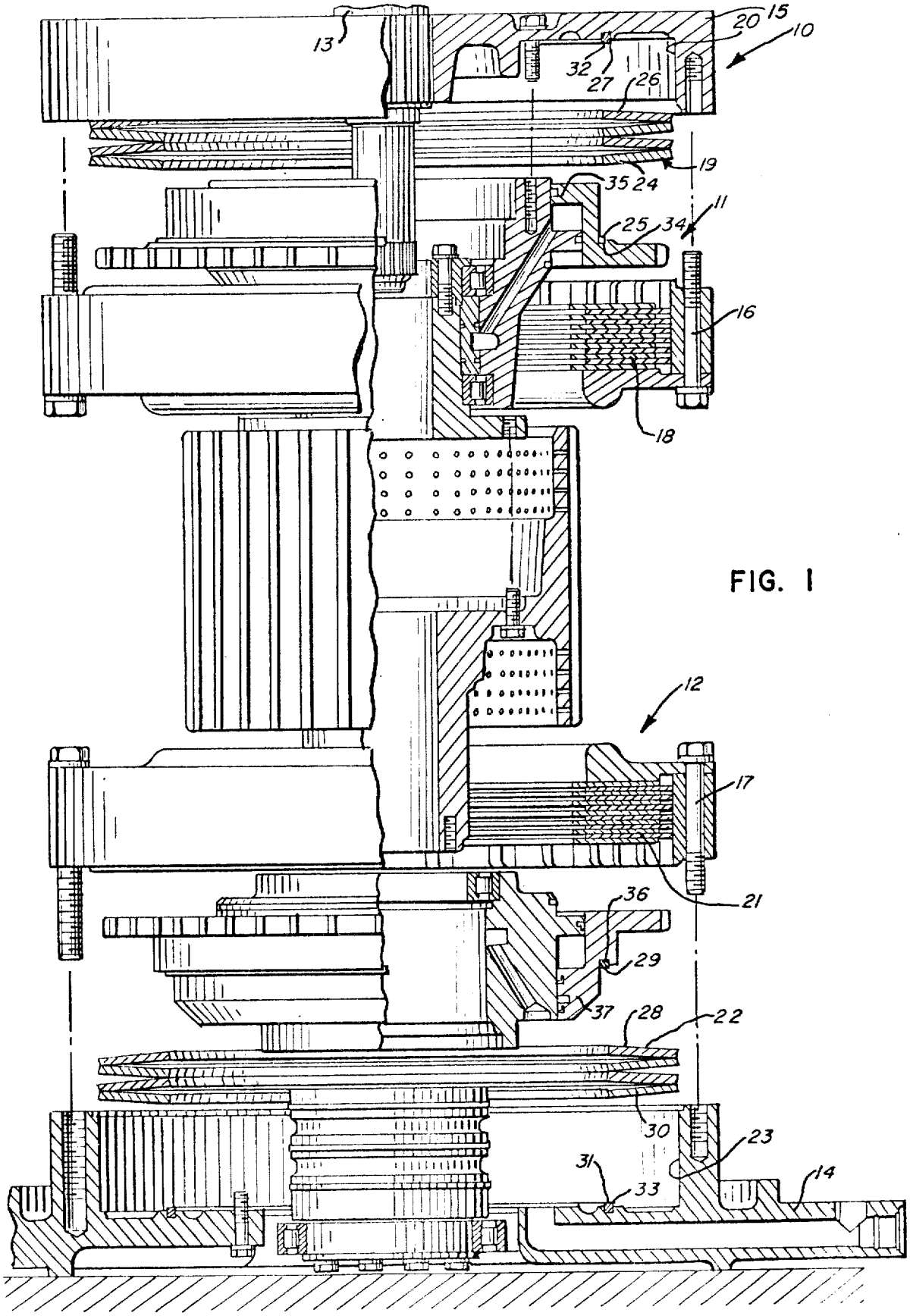
FIG. 1 is a fragmentary diametric section of a power drive assembly having an improved wear ring arrangement embodying the invention.

In the exemplary embodiment of the invention as disclosed in the drawing, a power drive assembly generally designated 10 includes a clutch pack 11 and a brake pack 12. An input drive shaft 13 is connected to a brake housing 14 through the clutch pack 11 for controlled driving operation of an associated apparatus such as a tractor vehicle.

As shown in FIG. 1, the assembly may include a clutch housing 15 to which the clutch pack 11 is removably secured as by bolts 16. The brake pack 12 may be removably secured to the brake housing 14 by suitable means, such as bolts 17.

Clutch pack 11 includes a plurality of clutch plates 18 which are adapted to be biased by a Belleville spring assembly 19 received in a recess 20 of the clutch housing 15 in the assembled arrangement of the drive assembly.

Brake pack 12 includes a plurality of brake plates 21 adapted to be biased by a second Belleville spring assembly 22 received in a recess 23 of the brake housing 14 in the assembled arrangement of the power drive.

As further shown in FIG. 1, one end 24 of Belleville spring assembly 19 is adapted to the engaged by a wear ring 25 carried by the clutch pack 11 and the other end 26 of the Belleville spring assembly 19 is adapted to be engaged by a wear ring 27 carried by the clutch housing 15.

Similarly, one end 28 of the Belleville spring assembly 22 engages a wear ring 29 carried by the brake pack assembly 12 and the opposite end 30 of spring assembly 22 engages a wear ring 31 carried by the brake housing 14. As shown in FIG. 1, the wear ring 27 is received in a suitable groove 32 provided in the clutch housing 15 at the inner end of recess 20 and the wear ring 31 is received in a suitable groove 33 in the housing 14 at the inner end of recess 23. Wear ring 25 is received in a suitable groove 34 carried by a piston 35 of clutch pack 11 and wear ring 29 is received in a suitable groove 36 carried by a piston 37 of the brake pack 12.

Figure 2:
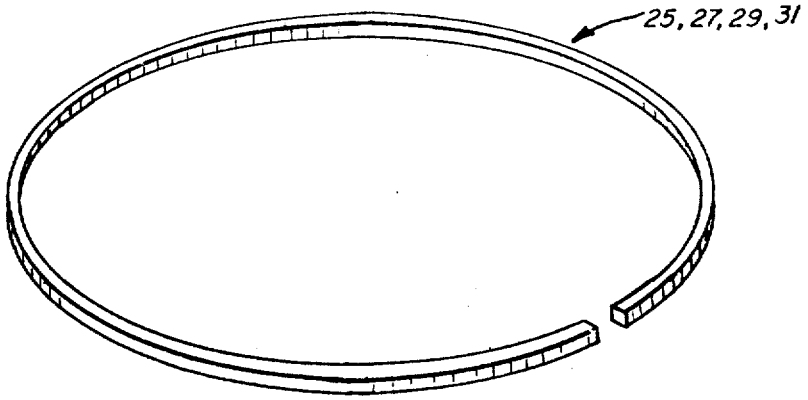
FIG. 2 is a perspective view of a wear ring for use therein.
Figure 3:
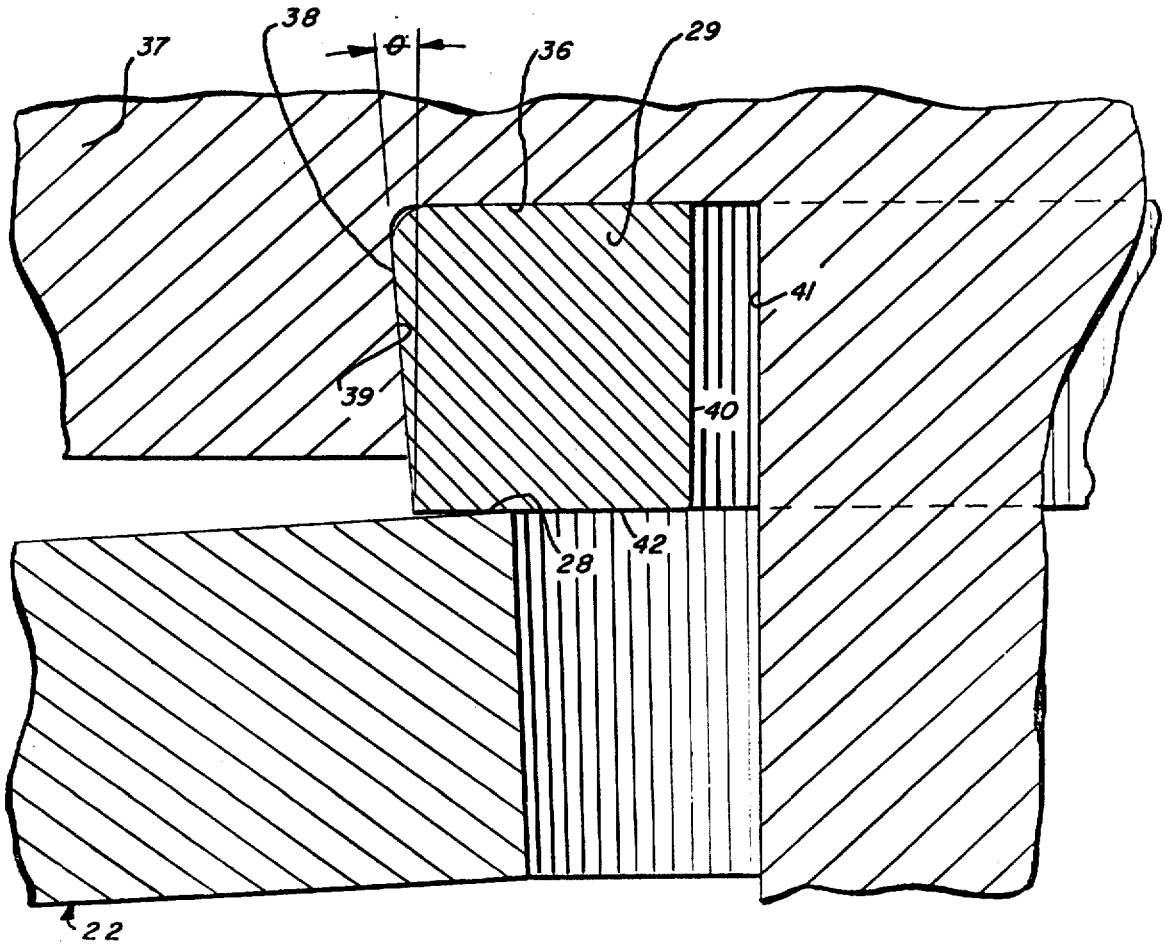
FIG. 3 is a fragmentary enlarged diametric section showing the association of the wear ring and Belleville spring in greater detail.

Referring now to FIGS. 2 and 3, the wear rings 25, 27, 29, and 31 comprise split rings adapted to be readily inserted into the respective grooves 32, 33, 34 and 36. As best seen in FIG. 3, the radially outer surface 38 of the wear ring is made to be frustoconical to correspond to an undercut surface 39 of the groove receiving the wear ring. In FIG. 3, the association of wear ring 29 with piston 37 in groove 36 is illustrated, the undercut surface [29] *39* of the groove 36 being shown as having an angle to the axis of the annular groove in the range of approximately 5° to 10°.

FIG. 3 illustrates the arrangement of the apparatus in the assembled condition wherein the brake pack 12 is installed in the recess 23 of the brake housing 14 so as to bring the wear ring 29 into engagement with the end 28 of spring 22 to provide the desired biasing of the brake plates 21. In effecting this assembly, the brake housing 14 may be arranged with the recess 23 opening upwardly permitting the spring assembly 22 to be dropped into place concentrically within recess 23 and then have the brake pack 12 brought downwardly with the wear ring 29 being retained in the groove 36 suitably to effect the desired insertion of the piston 37 into the spring assembly and bring the wear ring 29 into engagement with the spring assembly, as illustrated in FIG. 3.

As will be obvious to those skilled in the art, a reverse arrangement may be utilized in assembling the clutch pack 11 to the clutch housing 15. Thus, the assembly may be inverted so that the recess 20 of the clutch housing 15 may open upwardly so that a similar assembly of the clutch pack 11 with the wear ring 25 being retained in the groove 34 being effected during such assembly may be effected.

Alternatively, the housing 15 may be installed with the clutch pack extending outwardly in the arrangement of FIG. 1 with the spring assembly 19 installed on the piston 35 and with the housing 15 being brought down about the assembly. During such movement of the housing 15 downwardly about the spring 19, the wear ring 27 is retained in the groove 32 in a manner similar to the retention of wear ring 29 in groove 36, as discussed above.

As shown in FIG. 3, the groove receiving the wear ring may have a radial extent greater than the radial extent of the wear ring so as to permit facilitated installation and removal of the wear ring when desired. As shown, the radially inner surface 40 of the wear ring may be right circularly cylindrical and spaced radially outwardly of the complementarily right circularly cylindrical radially inner surface 41 of the groove.

As further shown in FIG. 3, the wear ring preferably has an axial extent slightly greater than the depth of the groove so as to permit the exposed outer surface 42 thereof to engage the juxtaposed end of the spring assembly (which, in FIG. 3, comprises end 28 of spring assembly 22).

The wear rings may be formed of any suitable resilient material, such as metal, for providing long, trouble-free life in the seating of the spring assemblies in the apparatus 10.

The foregoing disclosure of specific embodiments is illustrative of the broad inventive concepts comprehended by the invention.

The embodiments of the invention in which an exclusive property or privilege is claimed are defined as follows:

1. In a power drive assembly having a housing, a drive mechanism removably installed in said housing, and an annular biasing spring installed in said housing for biasing said mechanism, an improved wear ring arrangement comprising:

means on said mechanism defining an undercut annular groove opening coaxially toward an end of the biasing spring; and a *split* wear ring removably installed in said groove to engage said end of the biasing spring in the assembled arrangement of the power drive assembly, said wear ring having a cross section complementary to the undercut groove cross section whereby the mechanism may be installed in the housing with the groove opening downwardly and the wear ring maintained therein to removably engage said end of the biasing spring.

2. The power drive assembly of claim 1 wherein said housing is provided with an annular groove receiving a second wear ring to axially engage the opposite end of the biasing spring in the assembled arrangement of the power drive assembly.

3. The power drive assembly of claim 1 wherein said housing is provided with an annular groove receiving a second wear ring to axially engage the opposite end of the biasing spring in the assembled arrangement of the power drive assembly, said housing groove being undercut and said second wear ring being complementary thereto to be releasably maintained therein.

4. The power drive assembly of claim 1 wherein said biasing spring comprises a Belleville spring.

5. The power drive assembly of claim 1 wherein said biasing spring comprising a plurality of coaxially stacked Belleville spring elements.

6. The power drive assembly of claim 1 wherein said undercut groove defines a right circularly cylindrical side surface and an opposite frustoconical side surface.

7. The power drive assembly of claim 1 wherein said undercut groove defines a radially inner right circularly cylindrical side surface and an outer frustoconical side surface.

8. The power drive assembly of claim 1 wherein said undercut groove defines an undercut frustoconical sidewall extending at an angle of approximately 5° to 10° to the axis of operation of the annular groove.

9. The power drive assembly of claim 1 wherein said wear ring [comprises a split ring having] *has* at least one frustoconical radially facing side surface.

10. The power drive assembly of claim 1 wherein said drive mechanism comprises a clutch assembly.

11. The power drive assembly of claim 1 wherein said drive mechanism comprises a brake assembly.

*12. In a power drive assembly having a housing, a drive mechanism removably installed in said housing, and an annular biasing spring installed in said housing for biasing said mechanism, an improved wear ring arrangement comprising:*

*means on said housing defining an undercut annular groove opening coaxially toward an end of the biasing spring; and*

*a split wear ring removably installed in said groove to engage said end of the biasing spring in the assembled*

*arrangement of the power drive assembly, said wear ring having a cross section complementary to the undercut groove cross section whereby the housing may be installed about the mechanism with the groove opening downwardly and the wear ring maintained therein to removably engage said end of the biasing spring.*

*13. The power drive assembly of claim 12 wherein said biasing spring comprises a Belleville spring.*

*14. The power drive assembly of claim 12 wherein said biasing spring comprises a plurality of coaxially stacked Belleville spring elements.*

*15. The power drive assembly of claim 12 wherein said undercut groove defines a right circularly cylindrical side surface and an opposite frustoconical side surface.*

*16. The power drive assembly of claim 12 wherein said undercut groove defines a radially inner right circularly cylindrical side surface and an outer frustoconical side surface.*

*17. The power drive assembly of claim 12 wherein said undercut groove defines an undercut frustoconical sidewall extending at an angle of approximately 5° to 10° to the axis of operation of the annular groove.*

*18. The power drive assembly of claim 12 wherein said wear ring has at least one frustoconical radially facing side surface.*

*19. The power drive assembly of claim 12 wherein said drive mechanism comprises a clutch assembly.*

*20. The power drive assembly of claim 12 wherein said drive mechanism comprises a brake assembly.*

* * * * *